United States Patent [19]

Vaillancourt

[11] Patent Number: 5,348,112
[45] Date of Patent: Sep. 20, 1994

[54] MOTORCYCLE HEIGHT ADJUSTER

[75] Inventor: Gil J. Vaillancourt, Winnetka, Calif.

[73] Assignee: Works Performance Products, Inc., Northridge, Calif.

[21] Appl. No.: 20,069

[22] Filed: Feb. 19, 1993

[51] Int. Cl.⁵ .............................................. B62D 61/02
[52] U.S. Cl. .................................. 180/227; 280/6.12; 280/703; 280/709; 267/64.16
[58] Field of Search ................ 180/219, 227; 280/201, 280/6.12, 703, 709, 284, 285, 287, 283, 708; 267/64.16, 64.28; 188/322.21

[56] References Cited

U.S. PATENT DOCUMENTS

| | | | |
|---|---|---|---|
| 3,854,710 | 12/1974 | Nicholls | 280/708 |
| 4,052,088 | 10/1977 | Nicholls | 267/64.16 |
| 4,159,105 | 6/1979 | Vander Laan et al. | 267/177 |
| 4,422,661 | 12/1983 | Kawamura | 280/276 |
| 4,568,101 | 2/1986 | Bleustein et al. | 280/707 |
| 4,815,758 | 3/1989 | Yoshida | 280/840 |
| 5,009,451 | 4/1991 | Hayashi et al. | 280/724 |
| 5,086,866 | 2/1992 | Banjo et al. | 180/219 |
| 5,101,923 | 4/1992 | Odagi et al. | 180/219 |
| 5,201,384 | 4/1993 | Kiyota et al. | 180/219 |

FOREIGN PATENT DOCUMENTS 0172093 7/1989 Japan .................................. 180/227

Primary Examiner—Karin L. Tyson
Assistant Examiner—Anne Marie Boehler
Attorney, Agent, or Firm—Spensley Horn Jubas & Lubitz

[57] ABSTRACT

A hydraulically operated motorcycle height adjuster which may be used with "Softail" rear suspensions, includes a remote height adjustment knob that can be manipulated from the rider's position. The height adjuster comprises a height control unit including the height adjusting knob and a height adjustment unit connected between the motorcycle frame and the swing arm of the "Softail" suspension. The height control and adjustment units are hydraulically coupled so that rotation of the knob in one direction causes extension of a strut from the height adjustment unit thereby rotating the swing arm to lower the vehicle. A compression spring inside the height adjustment unit provides spring suspension which becomes stiffer as the motorcycle is lowered. The spring raises the motorcycle from its lowered position when the height adjustment knob is turned in the other direction permitting hydraulic fluid to flow from the adjustment unit back into the height control unit.

2 Claims, 3 Drawing Sheets

MOTORCYCLE HEIGHT ADJUSTER

FIELD OF THE INVENTION

The present invention relates generally to devices for adjusting the height of motorcycles and more particularly, to a hydraulic height adjuster for manually lowering the vehicle and which can be operated on-the-go from the rider's position.

BACKGROUND OF THE INVENTION

Known motorcycle height adjustment mechanisms, such as those disclosed in U.S. Pat. Nos. 4,159,105 and 4,815,758, typically take the form of load levelers forming part of the rear shock absorbers. Such mechanisms make it possible to automatically or manually adjust the rear of the motorcycle in response to changes in load to maintain a substantially horizontal orientation of the motorcycle regardless of the load. With reference to U.S. Pat. No. 4,568,101, motorcycle height adjusters are also known which, for purposes of optimizing handling characteristics under a variety of operating conditions, automatically lower the vehicle at low road speeds and at rest, and raise the height of the vehicle at road speeds.

The present invention addresses the need, from performance, handling and esthetic standpoints, for a motorcycle height adjuster capable of easy manual operation from the rider's position for lowering the rear of the vehicle and maintaining the lowered height in a positive fashion. In addition, the motorcycle should be returnable by the rider to stock riding height in an equally easy fashion.

SUMMARY OF THE INVENTION

In accordance with the present invention, there is provided a hydraulically operated motorcycle height adjuster that is particularly advantageous for use with rear suspensions of the kind known as "Softail" suspensions popularized by Harley-Davidson. The height adjuster of the invention includes a remote adjustment knob that can be easily adjusted "on-the-go" from the rider's position. By turning the knob, the rider can lower the rear of the machine, for example, 1 ½ inches or more, thereby lowering the center of gravity, giving a "ground hugging" look and altering the ride quality. In the latter connection, the height adjuster of the present invention provides for a stiffer suspension as the motorcycle is increasingly lowered. With equal ease, the height adjuster may be operated to return the motorcycle to stock height for rough roads and more aggressive riding.

In accordance with one particular, exemplary embodiment of the invention, the height adjuster of the present invention consists of a hydraulic height control unit including a height adjusting knob positioned within easy reach of the rider, for example, just below the seat of the motorcycle. Rotation of the knob by the rider advances or retracts a rotatable, threadedly mounted fluid displacement member relative to a hydraulic fluid reservoir within the height control unit. A hydraulic height adjustment unit, having an extendable/retractable strut projecting from a height adjustment cylinder, is connected between the motorcycle frame and the "Softail" swing arm carrying the rear wheel. The height control unit and the adjustment unit are hydraulically coupled so that clockwise rotation of the height adjustment knob by the rider causes the fluid displacement member to displace fluid in the reservoir thereby extending the height adjustment unit strut. The extending strut rotates the swing arm to lower the rear of the motorcycle and maintains the lowered height in positive fashion. A compression spring within the cylinder of the height adjustment unit biases the height adjustment unit strut toward its retracted position and provides spring suspension which becomes stiffer as the vehicle is lowered thereby altering the ride quality and maintaining resistance to bottoming. The spring raises the motorcycle from its lowered position when the height adjustment knob is turned counterclockwise, causing hydraulic fluid to flow from the adjustment unit back into the height control unit.

BRIEF DESCRIPTION OF THE DRAWINGS

Further objects, advantages and features of the present invention will become evident from the detailed description of the preferred embodiment, below, when read in conjunction with the accompanying drawings in which.

DETAILED DESCRIPTION OF THE PREFERRED EMBODIMENT

Figure 1:
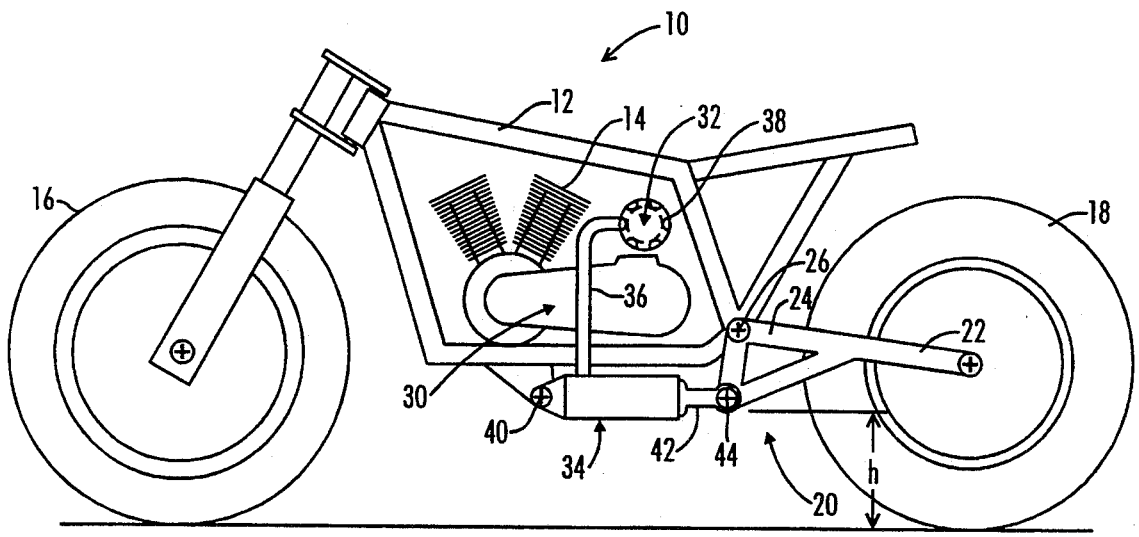
FIG. 1 is a schematic side elevation view of a motorcycle incorporating the height adjuster of the present invention and showing the vehicle at its stock riding height.
Figure 2:
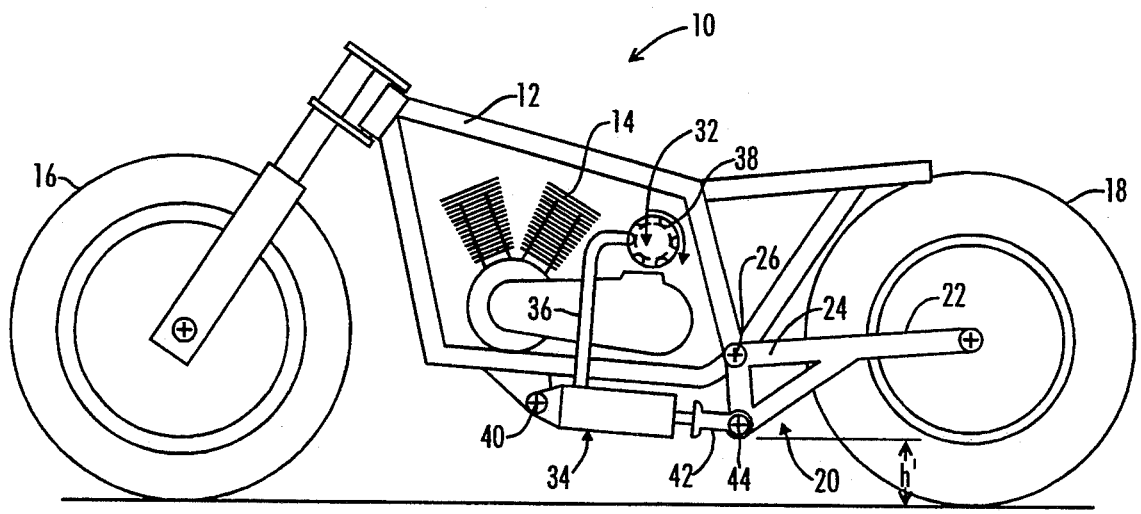
FIG. 2 shows the motorcycle of FIG. 1 in its lowered ride height configuration.

With reference to FIGS. 1 and 2, there is shown, in schematic form, a motorcycle 10 including a frame 12, an engine 14 and front and rear wheels 16 and 18. The motorcycle 10, in accordance with the specific embodiment shown, has a "Softail" type of rear suspension 20 which, as is well known in the art, includes a generally triangular swing arm 22 having a rear extremity carrying the rear wheel 18 and a front extremity 24 pivotally coupled to the frame 12 at a point 26.

In accordance with the invention, the motorcycle 10 also includes a height adjuster mechanism 30 comprising, generally, a height control unit 32, a height adjustment unit 34 and a hydraulic line 36 coupling the units 32 and 34. The height control unit 32 may be positioned on the frame 12 in any convenient fashion. For example, as shown in FIGS. 1 and 2, the unit 32 may be positioned transverse to the direction of motorcycle travel just below the motorcycle seat. In any case, the unit 32 includes a knob 38 within easy reach of the rider. The height adjustment unit 34 is a horizontally disposed, longitudinally extending unit positioned below the frame 12 and includes a front end pivotally attached to a point 40 on the frame 12. It will be understood that the unit 34 may be oriented generally vertically or in other directions as may be dictated by the design of the particular rear suspension. An extendable/retractable strut 42, projecting from the rear of the unit 34, is connected to the swing arm 22 at a point 44 below the swing arm pivot 26. In the typical installation, a shock absorber (not shown) is mounted adjacent the unit 34, parallel thereto and also connected between the frame 12 the swing arm 22.

FIG. 1 shows the motorcycle 10 at its stock height h. Clockwise rotation of the knob 38, as shown by the arrow in FIG. 2, causes the strut 42 to extend from the unit 34 thereby rotating the swing arm 22 counterclockwise about the frame pivot 26 and lowering the rear of the motorcycle to a height h'. Counterclockwise rotation of the knob 38 returns the motorcycle to its stock height h. The manner in which such height control is achieved in accordance with the invention will now be described with reference to FIGS. 3 and 4.

Figure 3:
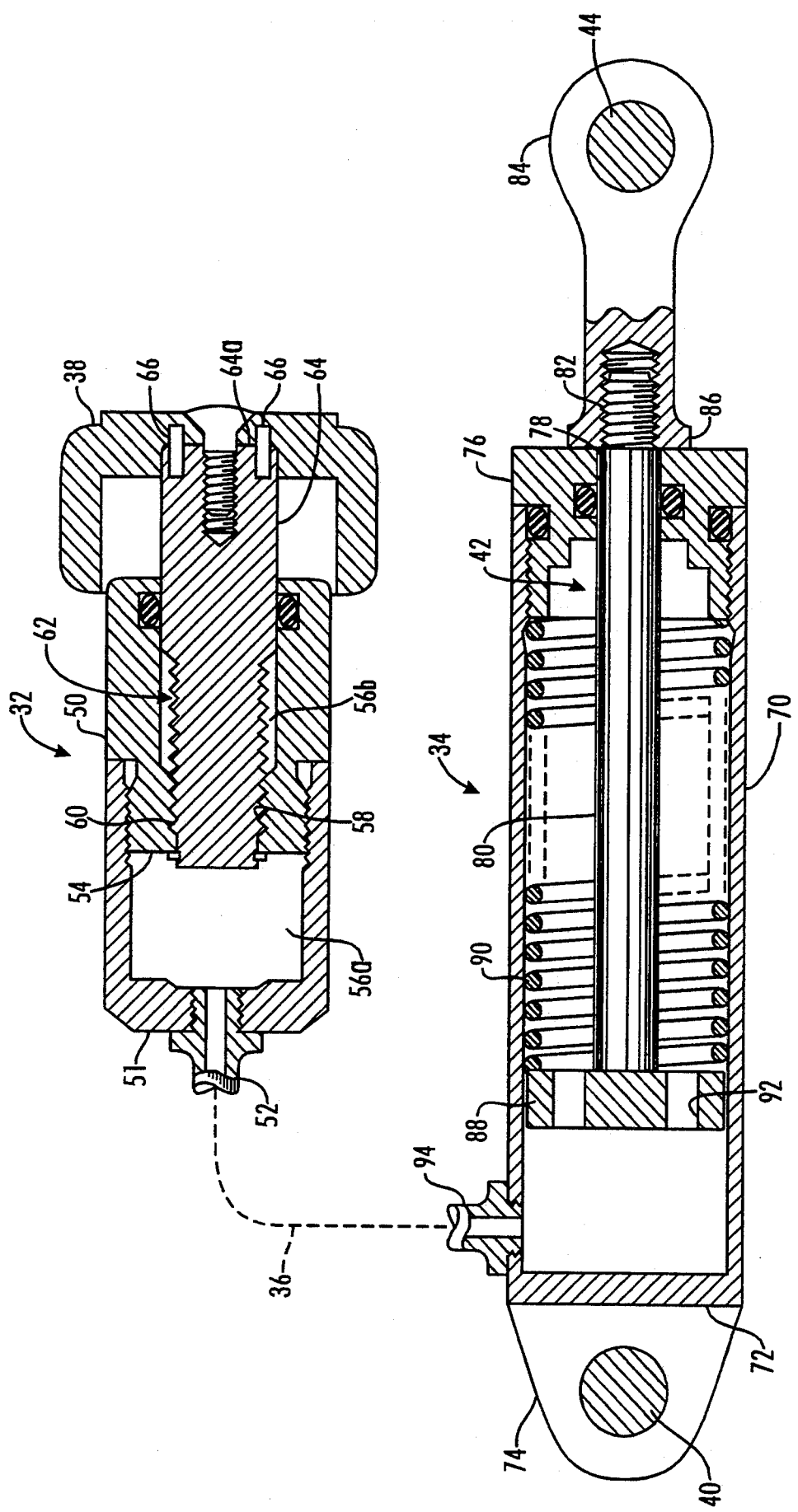
FIG. 3 is a longitudinal cross-section of the height adjuster of the present invention showing the height adjuster in its stock riding height configuration.
Figure 4:
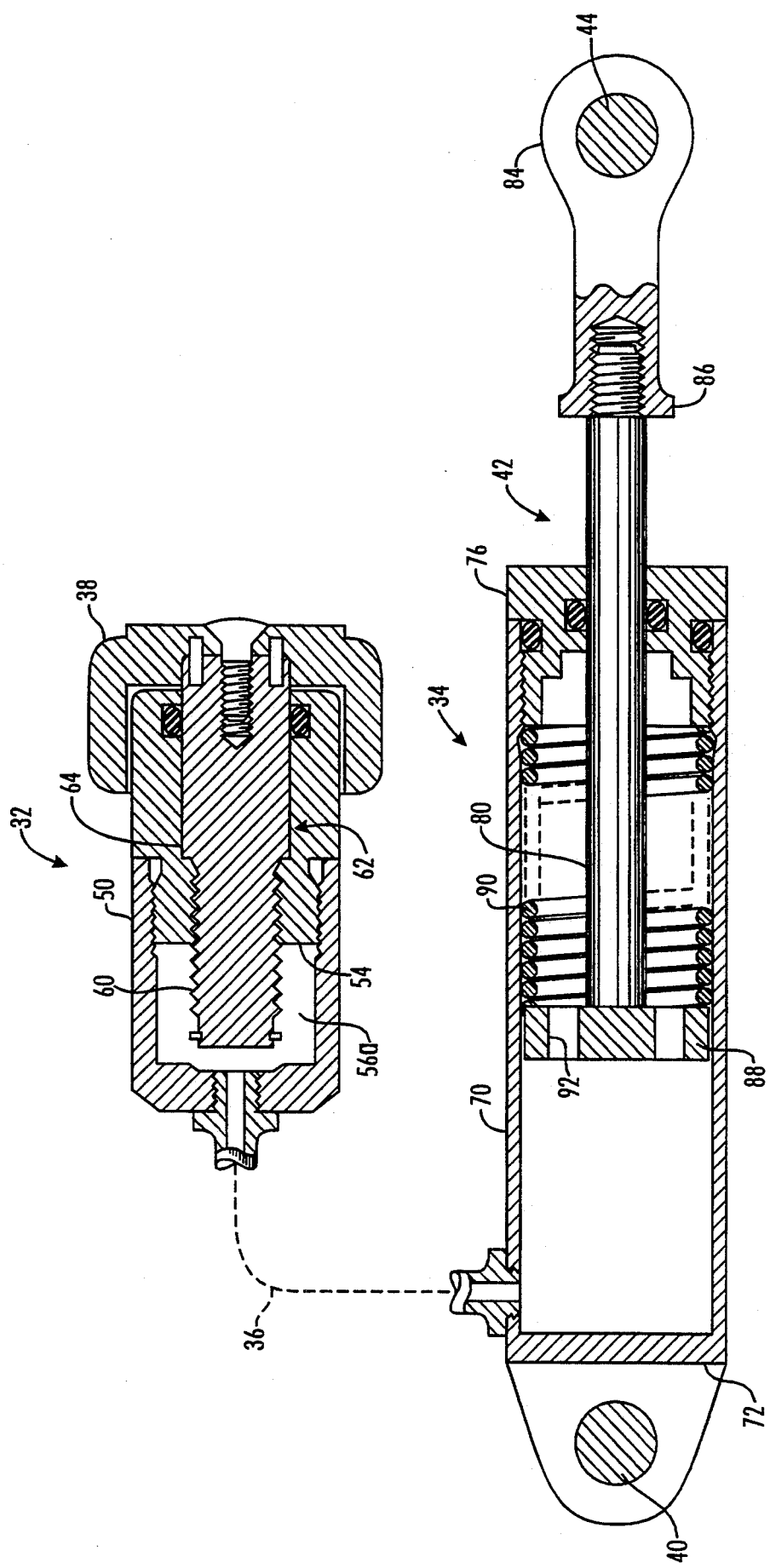
FIG. 4 shows the height adjuster of FIG. 3 in its fully lowered configuration.

The height control unit 32 includes a cylinder 50 having one end 51 provided with a hydraulic fitting 52 to which an end of the hydraulic line 36 is coupled. The cylinder 50 further has an internal, transverse wall 54 defining with the cylinder 50 a hydraulic fluid reservoir having a portion 56a on one side of the wall 54 and a portion 56b on the other side of the wall 54. The wall 54 includes a threaded bore 58 receiving a threaded section 60 of a fluid displacement member 62. The thread fit is such as to permit flow of hydraulic fluid between the reservoir portions 56a and 56b. The displacement member 62 further has an enlarged, non-threaded section comprising a piston 64 having an end 64a projecting from the cylinder 50. The knob 38 is secured to the end 64a of the piston 64 by fastening means including pins 66 keying the knob 38 to the fluid displacement member 62. It will thus be seen that rotation of the knob 38 in one direction (for example, clockwise) advances the piston 64 from the fully retracted position shown in FIG. 3 into the reservoir portion 56b so as to displace fluid therein. The maximum extension of the piston 64, in which position it occupies substantially the entire volume of the reservoir portion 56b, is shown in FIG. 4. Counterclockwise rotation of the knob 38 withdraws the piston 64 from the reservoir portion 56b until the piston reaches the fully retracted position shown in FIG. 3.

The height adjustment unit 34 includes a cylinder 70 having a front, closed end 72 connected by means of a bracket 74 to the frame attachment and pivot point 40. The cylinder 70 further includes a rear end having a threaded cap 76 defining a central bore 78. The strut 42 includes a rod 80 sealingly received by the bore 78 and having a threaded stub 82 projecting from the cap 76. An eye 84, attached to the threaded stub 82, is connected to the swing arm point 44. A flange 86 on the forward end of the eye 84 engages the cap 76 when the strut is fully retracted, as shown in FIG. 3, to prevent further retraction of the strut.

The front end of the rod 80 is attached to a generally cylindrical rod guide 88 loosely received by the cylinder 70. A compression spring 90 disposed between the rod guide 88 and cap 76 biases the strut towards its fully retracted position (FIG. 3). The rod guide 88 also includes at least one, and preferably a plurality of, longitudinally extending holes 92 providing fluid communication between the portions of the cylinder 70 in front of and behind the rod guide 88. For example, six (6) holes 92 may be provided each of which is relatively large, for example, ¼ inch in diameter so as to provide high speed damping.

The closed end 72 of the cylinder 70 includes a hydraulic fitting 94 for receiving the other end of the hydraulic line 36. With the height adjustment unit in the retracted configuration shown in FIG. 3, the entire internal volume comprising the reservoir portions 56a and 56b, hydraulic line 36 and the cylinder 70 is filled with hydraulic fluid.

In operation, to lower the rear of the motorcycle, the rider turns the knob 38 clockwise to rotate the fluid displacement member 62 thereby advancing the piston 64 into the reservoir portion 56b. The fluid displaced thereby flows from the reservoir portion 56a into the cylinder 70 causing the rod 80 to extend from the rear of the unit 34 a distance which is a function of the ratio of the diameter of the piston 64 to the diameter of the rod 80. The actual extension is, of course, less than mathematically ideal because there may be a small amount of air trapped in the hydraulic fluid which is compressed as the piston 62 advances and because of expansion of the line 36, cylinder 70, and other components resulting from the applied hydraulic pressure. For the foregoing reasons, it may take about one full turn of the knob 38 before extension of the rod 80 begins. Extension of the rod 80 causes compression of the spring 90 (along with the spring of a shock absorber typically mounted in parallel with the unit 34) from its preloaded state thereby stiffening the ride as the motorcycle is lowered; resistance to bottoming is thereby also maintained. The lowered position is positively maintained. To raise the motorcycle, the knob 38 is turned counterclockwise causing retraction of the piston 64 and flow of fluid back into the reservoir 56a/56b under the urging of spring 90.

The following specifications are in accordance with one practical example of the invention:

Height Control Unit 32

Diameter of piston 64: 1 inch.
Maximum extension of piston 64 into reservoir portion 56b: 182 inch.
Diameter and pitch of threads on threaded section 60: ¾ inch, 20 threads per inch.
Diameter of knob 38: 2 ¾ inches.

Height Adjustment Unit 34

ID of cylinder: 1 13/16 inches.
Overall length of cylinder: 6 ½ inches.
Length of spring 90 (FIG. 3): 5 ½ inches.
Spring constant: 1,150 lbs per inch.
Diameter of rod 80: ¾ inch.
Maximum extension of strut 42: 0.8 inch.

With a 3:1 lever ratio provided by the swing arm 22, the motorcycle, in accordance with the foregoing example, is lowered about 2.4 inches.

What is claimed is:

1. A motorcycle height adjuster comprising:
   a height adjustment cylinder having a first end adapted to be connected to a motorcycle frame and a second end defining an opening;
   a rod guide disposed within the cylinder for movement therein;
   a rod having an inner end and an outer end, the inner end being connected to the rod guide, the rod extending from said rod guide through the opening in the cylinder to the outer end of the rod, the outer end of the rod being adapted to be coupled to a rear suspension swing arm;
   a compression spring disposed within the cylinder about the rod and extending between the rod guide and the second end of the cylinder, the compression spring tending to bias the rod guide toward the first end of the height adjustment cylinder;
   a height control unit adapted to be mounted on the motorcycle frame within reach of the rider, said height control unit including a reservoir having a first end in hydraulic fluid communication with the first end of the hydraulic adjustment cylinder, the height control unit including a fluid displacement member received by said unit, said fluid displacement member having a portion adapted to be advanced into the reservoir, and an outer end;

hydraulic fluid Substantially completely filling said height control unit reservoir and said height adjustment cylinder; and actuatable means connected to the outer end of the fluid displacement member portion for advancing or retracting the fluid displacement member whereby actuation of the actuatable means in one direction causes the rod to extend from the height adjustment cylinder under the urging of said hydraulic fluid to lower the height of the motorcycle, and actuation of the actuatable means in the other direction causes retraction of the fluid displacement member under the urging of the compression spring to restore the height of the motorcycle.

2. A motorcycle height adjuster, as defined in claim 1, in which:

the rod guide includes passages providing high speed damping.

* * * * *